United States Patent
Maguire, Jr.

(10) Patent No.: US 8,994,728 B2
(45) Date of Patent: *Mar. 31, 2015

(54) DISPLAY OF LIGHT FIELD IMAGE DATA USING A SPATIAL LIGHT MODULATOR AT A FOCAL LENGTH CORRESPONDING TO A SELECTED FOCUS DEPTH

(71) Applicant: Francis J. Maguire, Jr., Southbury, CT (US)

(72) Inventor: Francis J. Maguire, Jr., Southbury, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 14/076,186

(22) Filed: Nov. 9, 2013

(65) Prior Publication Data

US 2014/0210823 A1 Jul. 31, 2014

Related U.S. Application Data

(63) Continuation of application No. 13/910,841, filed on Jun. 5, 2013, now Pat. No. 8,581,929.

(60) Provisional application No. 61/655,931, filed on Jun. 5, 2012.

(51) Int. Cl.
| | |
|---|---|
| G06T 11/80 | (2006.01) |
| G06T 15/10 | (2011.01) |
| G06T 15/50 | (2011.01) |
| G06F 3/01 | (2006.01) |
| G06T 19/00 | (2011.01) |
| H04N 5/232 | (2006.01) |
| H04N 5/225 | (2006.01) |
| G02B 7/38 | (2006.01) |

(Continued)

(52) U.S. Cl.
CPC .............. *G06T 15/50* (2013.01); *G06T 15/06* (2013.01); *G06F 3/013* (2013.01); *G06T 19/00* (2013.01); *H04N 5/23212* (2013.01); *G06T 2200/21* (2013.01); *H04N 5/2254* (2013.01); *G02B 7/38* (2013.01); *G02B 26/0833* (2013.01); *G09G 2320/0261* (2013.01); *G09G 2320/028* (2013.01); *G09G 2354/00* (2013.01)
USPC .......................... 345/426; 356/3.02; 359/713

(58) Field of Classification Search
CPC .................................. G06T 15/06; G02B 3/14
USPC ........................... 345/426; 356/3.02; 359/713
See application file for complete search history.

(56) References Cited

U.S. PATENT DOCUMENTS

| | | |
|---|---|---|
| 5,422,653 A | 6/1995 | Maguire, Jr. |
| 5,644,324 A | 7/1997 | Maguire, Jr. |

(Continued)

OTHER PUBLICATIONS

Mantiuk et al., "Perception-Motivated High-Dynamic-Range Video Encoding," ACM Trans. Graphics, vol. 23, No. 3, 2004, pp. 733-741.

(Continued)

*Primary Examiner* — Javid A Amini

(57) ABSTRACT

A method and apparatus are shown that select a focus depth for digital light field image data that represents a scene having a plurality of objects at different focus depths, the selected focus depth corresponding to a layer of the digital light field image data at the selected focus depth, and display the layer of the digital light field image data by utilizing at least one spatial light modulator to present the layer of the digital light field image data at a focal length corresponding to the selected focus depth. A server is shown that communicates with at least one apparatus to facilitate performance of the method.

20 Claims, 3 Drawing Sheets

(51) Int. Cl.
*G06T 15/06* (2011.01)
*G02B 26/08* (2006.01)

(56) References Cited

U.S. PATENT DOCUMENTS

| | | |
|---|---|---|
| 6,953,249 B1 | 10/2005 | Maguire, Jr. |
| 8,100,543 B1 | 1/2012 | Luebke |
| 8,287,127 B2 | 10/2012 | Gao et al. |
| 8,442,397 B2 | 5/2013 | Kang et al. |
| 2006/0002611 A1 | 1/2006 | Mantiuk et al. |
| 2008/0080846 A1 | 4/2008 | Grip |
| 2008/0131019 A1 | 6/2008 | Ng |
| 2012/0019703 A1 | 1/2012 | Thorn |
| 2012/0127558 A1 | 5/2012 | Haspeslagh et al. |
| 2012/0169724 A1 | 7/2012 | Park et al. |
| 2012/0194654 A1 | 8/2012 | Said et al. |
| 2013/0082905 A1 | 4/2013 | Ranieri et al. |

OTHER PUBLICATIONS

Ward et al, "Subband Encoding of High Dynamic Range Imagery," Proc. 1st Symp. Applied Perception in Graphics and Visualization (APGV), ACM Press, 2004, pp. 83-90.

Harris, "Light-Field Photography Revolutionizes Imaging," IEEE Spectrum, May 2012, 4 pages.

Wetzstein et al., "Compressive Light Field Displays," IEEE Computer Graphics and Applications, Sep./Oct. 2012, pp. 6-11.

Ng, "Digital Light Field Photography," Ph.D. dissertation, Stanford University, Jul. 2006, 203 pages.

Lanman et al., "Content-Adaptive Parallax Barriers: Optimizing Dual-Layer 3D Displays using Low-Rank Light Field Factorization," ACM Transactions on Graphics—Proceedings of ACM SIGGRAPH Asia 2010, vol. 29 Issue 6, Dec. 2010, 10 pages.

Lanman et al., "Polarization Fields: Dynamic Light Field Display using Multi-Layer LCDs," ACM Siggraph Asia, Dec. 2011, Transactions on Graphics 30(6), 9 pages.

Wetzstein et al., "Tensor Displays: Compressive Light Field Synthesis using Multilayer Displays with Directional Baclighting," SIGRRAPH 2012, Aug. 2012, ACM Transactions on Graphics 31(4), 11 pages.

Nava et al., "The Discrete Focal Stack Transform," 16th European Signal Processing Conference (EUSIPCO 2008), Lausanne, Switzerland, Aug. 25-29, 2008, 5 pages.

Wetzstein et al., Layered 3D: Tomographic Image Synthesis for Attenuation-based Light Field and High Dynamic Range Displays, ACM SIGGRAPH 2011, Aug. 2011, Transactions on Graphics 30(4), 11 pages.

Ng, "Fourier Slice Photography," ACM SIGGRAPH 2005, ACM Transactions on Graphics 24(3), Jul. 2005, 10 pages.

DISPLAY OF LIGHT FIELD IMAGE DATA USING A SPATIAL LIGHT MODULATOR AT A FOCAL LENGTH CORRESPONDING TO A SELECTED FOCUS DEPTH

BACKGROUND

Digital images, whether real or virtual, have heretofore largely been confined to capture and display at a fixed focal length.

SUMMARY

According to a first aspect of the present invention, a method comprises selecting a focus depth for digital light field image data that represents a scene having a plurality of objects at different focus depths, the selected focus depth corresponding to a layer of the light field image data at the selected focus depth, and displaying the layer of the digital light field image data by an apparatus utilizing at least one spatial light modulator in the apparatus to present the layer of the digital light field image data at a focal length corresponding to the selected focus depth.

In accordance with the first aspect of the invention, the digital light field image data may be captured with a digital light field camera.

In further accord with the first aspect of the invention, the digital light field image data may be computed with a digital processor.

In still further accord with the first aspect of the invention, the digital light field image data may be captured in part with a digital light field camera and is in part computed with a digital processor.

In further accordance with the first aspect of the present invention, the method may further comprise presenting a different layer of the digital light field image data at a focal length corresponding to a different focus depth.

In further accord with the first aspect of the present invention, the method may further comprise selecting a plurality of focus depths and the apparatus presenting a corresponding plurality of layers of the light field image data at a corresponding plurality of focal lengths so as to represent the scene as a set of digital light field image data layers in a three dimensional representation of the plurality of objects in the scene. The plurality of focus depths may be preselected and successive sets of image data layers may be presented cyclically at a set repetition rate by the apparatus. A number of layers in one or more successive sets may be varied during selected cyclic set repetition periods by the apparatus. An image characteristic of one or more separate layers may be varied during selected cyclic set repetition periods by the apparatus.

In further accordance with the first aspect of the present invention, the method may further comprise detecting eye gaze of a user and selecting the focus depth based on a change in the detected eye gaze of the user, and presenting a layer of the digital light field image data corresponding to the detected focus depth at a focal length corresponding to the selected focus depth. In this connection, the method may further comprise detecting a change in the eye gaze of the user and presenting a different layer of the digital light field image data corresponding to the detected change in the eye gaze of the user by presenting the different layer of the digital light field image data at a focal length corresponding to the different focus depth.

In still further accord with the first aspect of the present invention, the apparatus may evaluate the scene and select a focus depth corresponding to a depth of an object judged to be in motion.

In further accordance with the first aspect of the present invention, the digital light field image data may be a sequence of pictures in layered sets compressed on a layer level basis with pictures at a same level in successive sets grouped for decompression so that separate decompressions for picture sequences at each level are executable as parallel decompression processes.

Further still in accordance with the first aspect of the present invention the displaying may include displaying a portion of the layer of the digital light field image data radially surrounding at least one of the one or more objects to be displayed with less distinction to simulate human vision where objects surrounding an object at which visual attention is directed appear with less distinction than the object at which the visual attention is directed.

According to a second aspect of the present invention, an apparatus comprises at least one processor and at least one memory including computer program code, the at least one memory and the computer program code configured to, with the at least one processor, cause the apparatus at least to select a focus depth for light field image data that represents a scene having a plurality of objects at different focus depths, the selected focus depth corresponding to a layer of the digital light field image data at the selected focus depth, and display the layer of the digital light field image data utilizing at least one spatial light modulator to present the layer of the digital light field image data at a focal length corresponding to the selected focus depth.

In accordance with the second aspect of the invention, the digital light field image data may be captured with a digital light field camera.

In further accord with the second aspect of the invention, the digital light field image data may be rendered with a processor of a digital computer.

In still further accord with the second aspect of the invention, the digital light field image data may be captured in part with a digital light field camera and is in part rendered with a processor of a digital computer.

In accordance still further with the second aspect of the present invention, the at least one memory and the computer program code may be configured to, with the at least one processor, cause the apparatus at least to detect eye gaze of a user and select a focus depth based on a change in the detected eye gaze of the user, and present a layer of the digital light field image data for the detected focus depth at a focal length corresponding to the selected focus depth.

Further in accord with the second aspect of the present invention, the at least one memory and the computer program code may be configured to, with the at least one processor, cause the apparatus at least to detect a change in the eye gaze of the user and present a different layer of the digital light field image data corresponding to the detected change in the eye gaze of the user at a focal length corresponding to a different focus depth.

In still further accord with the second aspect of the present invention, the display of the image data may include the display of objects having focus depths that are different than the selected focus depth of the one or more of the plurality of objects so as to be out of focus.

Further in accord with the second aspect of the present invention, the at least one processor and the at least one memory including computer program code may be configured to, with the at least one processor, cause the apparatus at least to present a different layer of the digital light field image data at a focal length corresponding to a different focus depth.

In still further accord with the second aspect of the present invention, the at least one processor and the at least one memory including computer program code may be configured to, with the at least one processor, cause the apparatus at least to select a plurality of focus depths and display the image data at a corresponding plurality of focal lengths so as to represent the scene as a set of image data layers in a three dimensional representation of the plurality of objects in the scene. The plurality of focus depths may be preselected and successive sets of image data layers presented cyclically at a set repetition rate. The number of layers in one or more successive sets may be varied during selected cyclic set repetition periods. The plurality of focus depths may be preselected and successive sets of image data layers may be presented cyclically at a set repetition rate by the apparatus. A number of layers in one or more successive sets may be varied during selected cyclic set repetition periods by the apparatus. An image characteristic of one or more separate layers may be varied during selected cyclic set repetition periods by the apparatus.

In still further accord with the second aspect of the present invention, the apparatus may further comprise a user input device. The user input device may comprise a digital light field camera for providing said digital light field image data.

In still further accord with the second aspect of the present invention, the at least one memory and the computer program code may be configured to, with the at least one processor, cause the apparatus at least to evaluate the scene and select a focus depth corresponding to a depth of an object judged to be in motion.

Further still in accord with the second aspect of the present invention, the display of the image data may include display of portions of the layer of the digital light field image data radially surrounding the at least one of the one or more objects to be displayed with less distinction to simulate human vision where objects surrounding an object at which visual attention is directed appear with less distinction than the object at which the visual attention is directed.

According to a third aspect of the present invention, a method comprises a server retrieving from a storage device on the server, in response to a request from a user apparatus, a signal comprising digital light field image data at a selected focus depth that represents a scene having a plurality of objects at different focus depths, the selected focus depth corresponding to a layer of the light field image data at the selected focus depth, and the server transmitting the retrieved signal to the user apparatus for display of the layer of the digital light field image data by the user apparatus utilizing at least one spatial light modulator in the user apparatus to present the layer of the digital light field image data at a focal length corresponding to the selected focus depth.

In further accord with the third aspect of the present invention, the method may further comprise the server retrieving and transmitting to the user apparatus a different layer of the digital light field image data for presentation at a focal length corresponding to a different focus depth.

In still further accord with the third aspect of the present invention, the method may further comprise the server retrieving and transmitting to the user apparatus a digital light field data signal comprising a plurality of focus depths for presentation by the user apparatus as a corresponding plurality of layers of the light field image data at a corresponding plurality of focal lengths so as to represent the scene as a set of digital light field image data layers in a three dimensional representation of the plurality of objects in the scene.

Further in accord with the third aspect of the present invention, the plurality of focus depths may be preselected and successive sets of image data layers may be for presentation cyclically at a set repetition rate by the user apparatus.

Further in accord with the third aspect of the present invention, a number of layers in one or more successive sets may be varied during selected cyclic set repetition periods.

Still further in accord with the third aspect of the present invention, an image characteristic of one or more separate layers may be varied during selected cyclic set repetition periods.

Still further in accord with the third aspect of the present invention, the digital light field image data may be a sequence of pictures in layered sets compressed on a layer level basis with pictures at a same level in successive sets grouped for decompression so that separate decompressions for picture sequences at each level are executable as parallel decompression processes.

Still further in accord with the third aspect of the present invention, the displaying may include displaying a portion of the displayed image data radially surrounding the at least one of the one or more objects to be displayed with less distinction to simulate human vision where objects surrounding an object at which visual attention is directed appear with less distinction than the object at which the visual attention is directed.

These and other objects, features and advantages of the present invention will become more apparent in light of the detailed description of a best mode embodiment thereof, as illustrated in the accompanying drawing.

DETAILED DESCRIPTION

Light field image data may represent a scene having a plurality of objects at different depths that reflect light from one or more light sources. The light field is a function that describes the amount of light faring in every direction through every point in space in the scene volume. The amount of light faring along all the rays of light in the scene volume is a plenoptic function with each ray defined by its position and orientation in the volume, e.g., its x, y, z position and its direction defined by two angles that measure the projection of the ray vector onto the two planes e.g. the x-y and x-z planes in the scene volume. To obtain the radiance at a given point in the scene volume, all the rays or ray vectors from all directions intersecting that point may be integrated to give a resultant vector having a magnitude and an orientation with respect to the scene volume.

Higher dimensionality than the above described five dimensional plenoptic function can be considered for the light field, for instance by adding time, wavelength, and/or polarization angle. Likewise, the light field data may comprise a lesser number of dimensions. A four dimensional plenoptic function can be measured by taking many discrete photos using a digital camera to thereby approximate the radiance from all points by sampling and eliminating some data, much of which may be redundant. A 4D light field can be parameterized, e.g., by a two-plane parameterization. Such a two-plane light field may be a collection of perspective images of an s,t plane (and any objects that may lie astride or beyond it), each taken from an observer position on a parallel u,v plane (imagine vectors V(u,v,s,t) piercing both planes). Besides planes, the collection may span some portion of another shape such as a line, circle, sphere, or some other shape, depending on the chosen type of parameterization.

Light field image data captured by the plurality of cameras mentioned above arranged to form an arc of cameras, by a moving handheld camera, by a dense array of cameras, or by a stationary handheld camera (e.g., a plenoptic camera with a microlens array in front of the photo-sensor with each lens covering a small array of very densely packed pixel sensors), or other optical arrangement. The light field image data produced by a computer may be made by rendering a 3D model to produce light field views for a collection of viewpoints such as described above in the parallel plane parameterization example.

Figure 1:
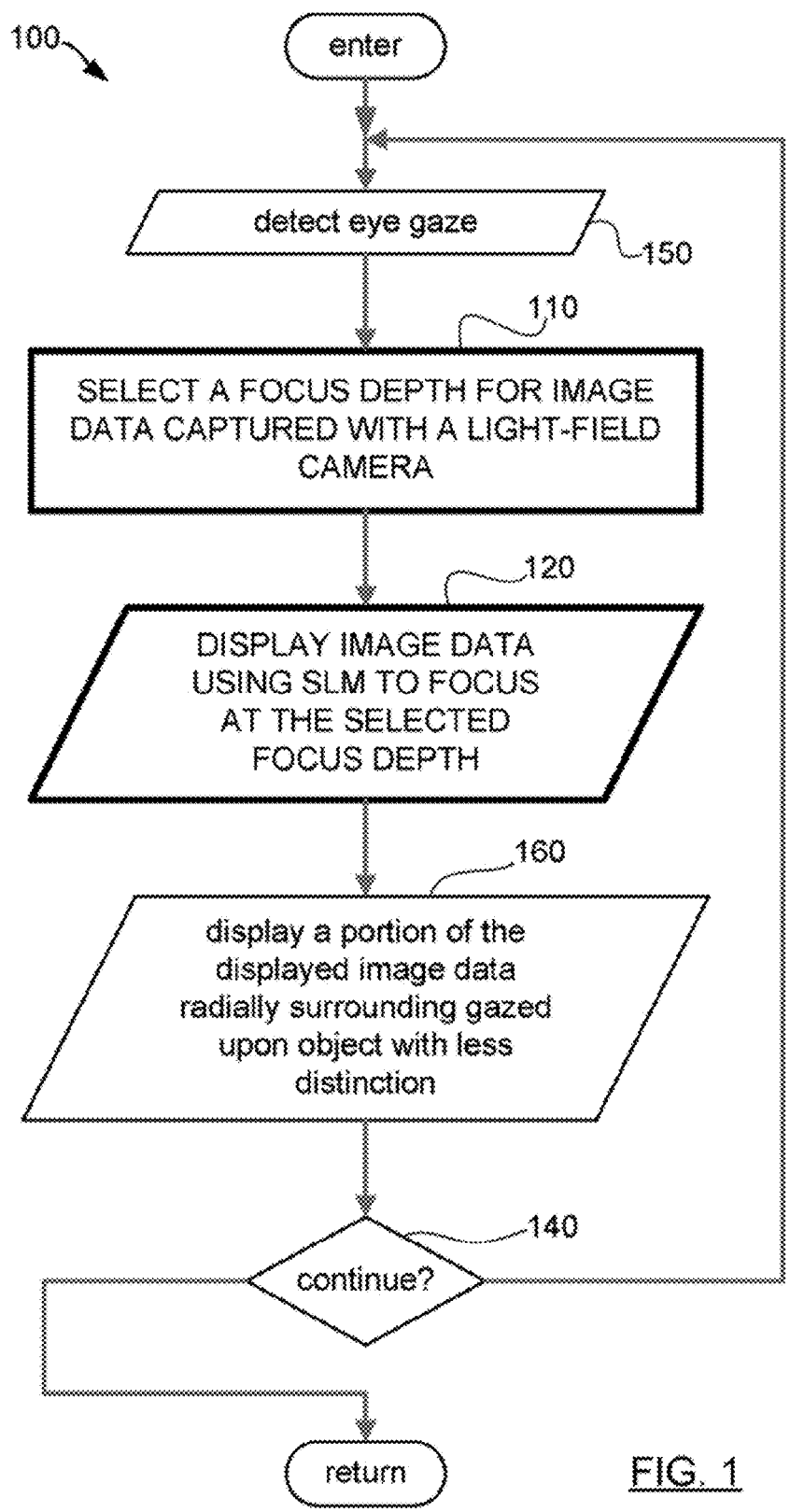
FIG. 1 shows a method, according to the invention.

Assuming light field image data is available, FIG. 1 shows a method 100, comprising an apparatus (such as an apparatus 200 shown in FIG. 2) selecting 110 a focus depth for light field image data, for instance light field image data captured with at least one light-field camera or computed with one or more processors or computer workstations by means of a program or software including coded instructions stored on at least one computer readable medium. The light field image data represents a scene having a plurality of objects at different depths that reflect light from one or more light sources. The selected focus depth corresponds to a layer of the digital light field image data that may include a representation of at least part of one or more of the plurality of objects at the selected focus depth. In other words, the layer may comprise a plurality of points and the radiance at each point is defined by a vector having at least a luminance magnitude and direction in space such as described above. The magnitude of the luminance may represent a monochrome value or be broken down into color components. Rather than attempting to reproduce the radiance at all points in the scene volume, only a selected number of points in selected layers of the volume may reproduced. The selected number of points may be constrained, e.g., by the number of pixels in an image sensor or the number of lenses in a microlens sheet facing the sensors and like considerations. The selected number may be fixed or may be varied between layers. The points may be distributed uniformly over a layer, for instance in rows and columns, or they could be distributed a nonuniform way such as to provide a foveation effect. The act of selecting may be carried out by the apparatus decoding an indication of a focus depth encoded in association with a corresponding layer of the light field image data e.g. in a signal retrieved from storage or received over a network. The apparatus might then use a decoded indication thereof to cause the spatial light modulator to present the image data as the selected layer of points of radiance at a focal length corresponding to the selected focus depth. This might for instance involve the signal processor consulting a lookup table to find one or more commands corresponding to the selected focus depth that it may then use to command the spatial light modulator 210 to spatially modulate the light 232 from the light source 234 so as to present the decoded layer of the light field image data as corresponding points of radiance corresponding to the layer of the data at the selected focus depth. This results in a light field that reproduces the radiances of the points of the decoded layer at the commanded focal length. The act of selecting may but need not involve direct user input (by the user of the apparatus 200) or indirect user input (by the user or another user of another device at a distance in space and/or time).

Image data is displayed 120 utilizing at least one spatial light modulator 210 by presenting the corresponding layer of the light field image data at a focal length corresponding to the selected focus depth. This permits the user's eyes to perceive the scene with depth perception, e.g., to volitionally or reflexively accommodate to the selected focus depth or at a plurality of selected focus depths in succession, when using the apparatus of FIG. 2. This makes the user able to perceive the image data with depth perception as if viewing the one or more of the plurality of objects at the selected focus depth or depths. The apparatus 200 may be part of a light field camera or may be a separate apparatus.

If it is decided 140 to continue, the displayed image data may be presented for a different one or more different layers of the digital light field image data corresponding to one or more different focus depths by presenting 120 the displayed image data at different focal lengths. Or, the selected focus depth may be retained until a subsequent decision is made to change to a different focus depth.

In connection with the selection 110 of the focus depth, a user input such as eye gaze of a user of the apparatus 200 or a user of another apparatus (not shown) may be received or detected 150 and the focus depth selected 110 based on the user input or the detected eye gaze of the user gazing at one of the objects, and the image data for the selected focus depth presented at the focal length corresponding to the selected focus depth.

Further in this connection, after deciding to continue in the decision 140, a change in the user input or eye gaze of the user may be detected when the user changes the selection or the detected eye changes to gaze at a different object at a different focus depth. The image data for display at a layer corresponding to the changed selection or for the detected change in the eye gaze of the user is then configured for presentation at a focal length corresponding to the different focus depth.

On account of the image data being captured with a light-field camera or rendered by a computer (or a combination of both), the displaying of the image data may include displaying objects having focus depths that are different than the selected focus depth of the one or more of the plurality of objects so as to be out of focus during one or more periods when the selected focus depth is different from the focus depth of the one or more of the plurality of objects.

The method 10 may also include displaying 160 a portion of the layer of digital light field image data radially surrounding the at least one of the one or more objects to be displayed with less distinction to simulate human vision (sometimes called "foveation" encoding) where objects surrounding an object at which visual attention is directed appear with less distinction than the object at which the visual attention is directed. The object at which visual attention is directed may be displayed with higher resolution, higher dynamic range, a greater color quality, greater brightness, a higher frame rate, or some other manner of differentiation on the basis of enhanced visual distinctness.

In this connection, higher resolution may be carried out by encoding the image area representative of the object at which visual attention is directed with so-called region-of-interest coding according to the JPEG 2000 standard or the Motion JPEG 2000 standard. Similarly, higher dynamic range (dynamic range is a measure of the relative brightness of the brightest and darkest parts of an image) may be carried out by encoding the image area that is representative of the object at which visual attention is directed in accordance with a so-called perception motivated encoding methodology. The surrounding area may be encoded with a lesser degree of dynamic range in accordance with conventional methodologies that are limited to reproducing a narrower dynamic range of at most only a few hundred to one. Such may apply a hybrid encoding method which applies compression to a high-dynamic range (HDR) video in two stages, first to the luminance channel and then to the resulting image in its frequency domain (see Mantiuk et al., "Perception-Motivated High-Dynamic-Range Vide Encoding," *ACM Trans. Graphics*, vol. 23, no. 3, 2004, pp. 733-741). In this connection, see also US Patent Application Publication No. US 2006/0002611 "Method and apparatus for encoding high dynamic range video," published Jan. 5, 2006 and based on application Ser. No. 10/884,178, filed Jul. 2, 2004. The method first quantizes the luminance channel of the HDR video using a nonlinear function, which distributes the quantization errors to match the luminance threshold of the human visual system in changing adaptation levels. It then sends the result from the first step to an extended discrete cosine transform (DCT)-based MPEG-4 video encoder for further data compression in the frequency domain. Another approach that is applicable in step 160 is described by G. Ward and M. Simmons in "Subband Encoding of High Dynamic Range Imagery," *Proc. 1st Symp. Applied Perception in Graphics and Visualization* (APGV), ACM Press, 2004, pp. 83-90.

Figure 2:
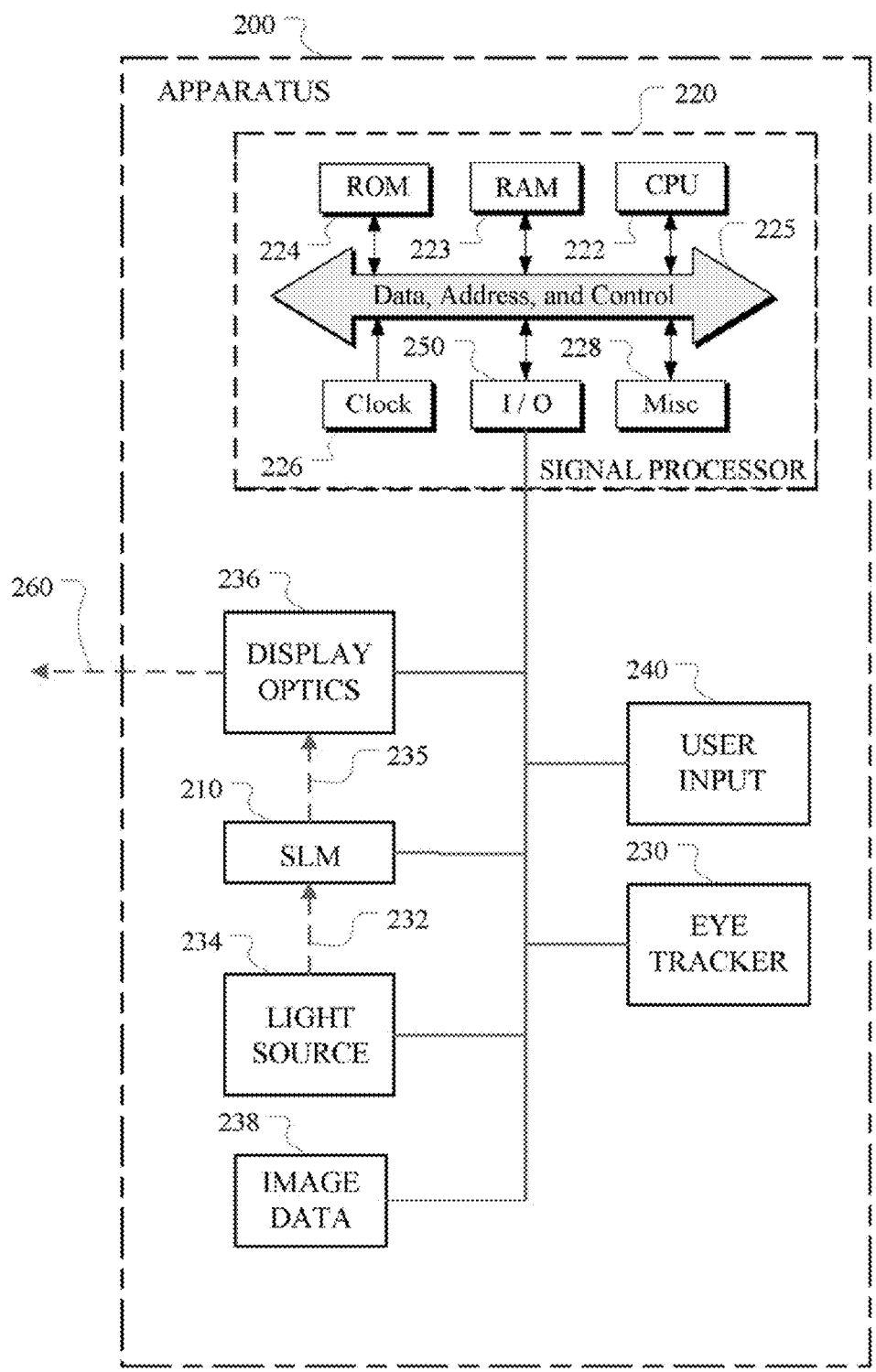
FIG. 2 shows an apparatus, according to the invention.

Referring now to FIG. 2, an apparatus 200 is shown including at least one processor 220 and at least one memory 223, 224 including computer program code, the at least one memory and the computer program code configured to, with the at least one processor, cause the apparatus at least to select 110 a focus depth for image data such as data captured with a digital light field (e.g. plenoptic) camera or rendered by a computer (or a combination of both a camera and computer rendered data) and representing a scene having a plurality of objects at different focus depths, the selected focus depth corresponding to one or more of the plurality of objects at the selected focus depth, and to display 120 the image data utilizing at least one spatial light modulator 210 by presenting a layer of the digital light field image data at a focal length corresponding to the selected focus depth.

The at least one spatial light modulator 210 may for instance comprise adaptive optics in the form of at least one deformable mirror such as a micromachined membrane deformable mirror (MMDM) device or a piezoelectric deformable mirror (PDM) device made by OKO Technologies, Polakweg 10-11, 2288 GG, Rijswijk ZH, The Netherlands. Or, it could take the form of at least one liquid crystal lens having a variable focal distance made by the same company. A micromirror array lens that may be applied for this purpose is shown in WO 2007/134264. The mirrors may take the form of micro electromechanical systems (MEMS) e.g. deflectable micro mirror devices (DMDs) from Texas Instruments. An optical apparatus can be used using a variable-optical-characteristic optical element whereby focusing can be effected without moving a lens and that is moreover deployable in a lightweight structure such as shown in U.S. Pat. No. 7,405,884. Alternatively, the spatial light modulator 210 may take the form of a MEMS platform such as made using semiconductor fabrication technology by IMEC in Leuven, Belgium, with very tiny mirrors capable of moving up and down, like small, reflective pistons. Each mirror, which has a spring-like mechanism (See, e.g. U.S. Pat. No. 7,919,901) attached to it, is pulled down or released by applying a voltage to it. In this case, it is not necessary to produce holographic imagery as a changing focal length for each successive virtual image frame will suffice. Alternatively, the at least one spatial light modulator 210 may comprise a stack of light attenuators, for example a stack of transparencies, masks or LCDs that function as general spatial light modulators that act in concert to re-create a light field by attenuating rays emitted by a uniform or directional backlight. See "Compressive Light Field Displays" by Wetzstein et al., *IEEE Computer Graphics and Applications*, September/October 2012, pp. 6-11.

In any event, in the embodiment of FIG. 2, the at least one spatial light modulator 210 is shown being responsive to light 232 from a light source 234 for providing spatially modulated light 235 either for direct viewing by an eye or eyes of a viewer or to display optics 236 which may for instance be one or more mirrors to reflect light modulated by the at least one SLM to an eye or to both eyes of the user (not shown) in the form of a reflected image as signified by a line 260 from the optics 236. In other words, the display optics 236 may be omitted in some embodiments or may take a form different from the one or more mirrors described above. An example would be a light field display using volumetric attenuators. The processor 220 accesses the image data from an image data source 238 which may for instance be a memory device of a kind suitable for the apparatus 200 that may store such image data permanently or semi-permanently or, may alternatively represent a cache for temporarily storing image data received from a streaming source i.e. from a remote streaming server sent over a network such as the Internet to the apparatus 200. If the apparatus 200 is part of a light field camera, then the image data 238 may be retrieved from a memory device within the light-field camera for storing image data captured and stored therein by the light field camera. Such a memory may be permanent memory resident within the camera or may be a removable memory device supplied by the user. Such a light field camera is sometimes called a plenoptic or polydioptric camera. Reference is made to previous work in the field by Levoy, M. and Hanrahan, P., 1996, *Light field rendering, SIGGRAPH* 96, 31-42, and by Ng, R., *Digital Light Field Photography*, Dissertation for Ph.D at Stanford, July 2006. If the apparatus is not part of a light field camera, then the image data 238 may be a memory device within a simple display apparatus that does not include a light field camera. Such could be for instance a portable consumer electronic device having a form and size suitable for handheld use and pocket or handbag carriage. In that case, as suggested, the image data may be carried by a removable memory device such as a flash memory card or it may be received over a network in the form for instance of a video stream from a server. In the case of removable memory, the apparatus 200 might be provided with a removable memory port. In the case of Internet sourcing, the apparatus 200 might be provided with wireless connectivity such as Wi-Fi or cellular wireless connectivity or with a receptacle such as an RJ-45 receptacle for a wired connection to an Ethernet cable via an RJ-45 jack inserted therein.

The at least one memory and the computer program code may but need not be configured to, with the at least one processor, cause the apparatus at least to receive user input such as by detecting 150 eye gaze of a user and to select 110 the focus depth based on the detected eye gaze of the user gazing at or toward the vicinity of reproduced points of radiance representing one or more of the objects, and present image data for the selected focus depth at a focal length corresponding to the selected focus depth. The apparatus may include a user input device 240 or an eye gaze tracker 230 for this purpose.

Figure 3:
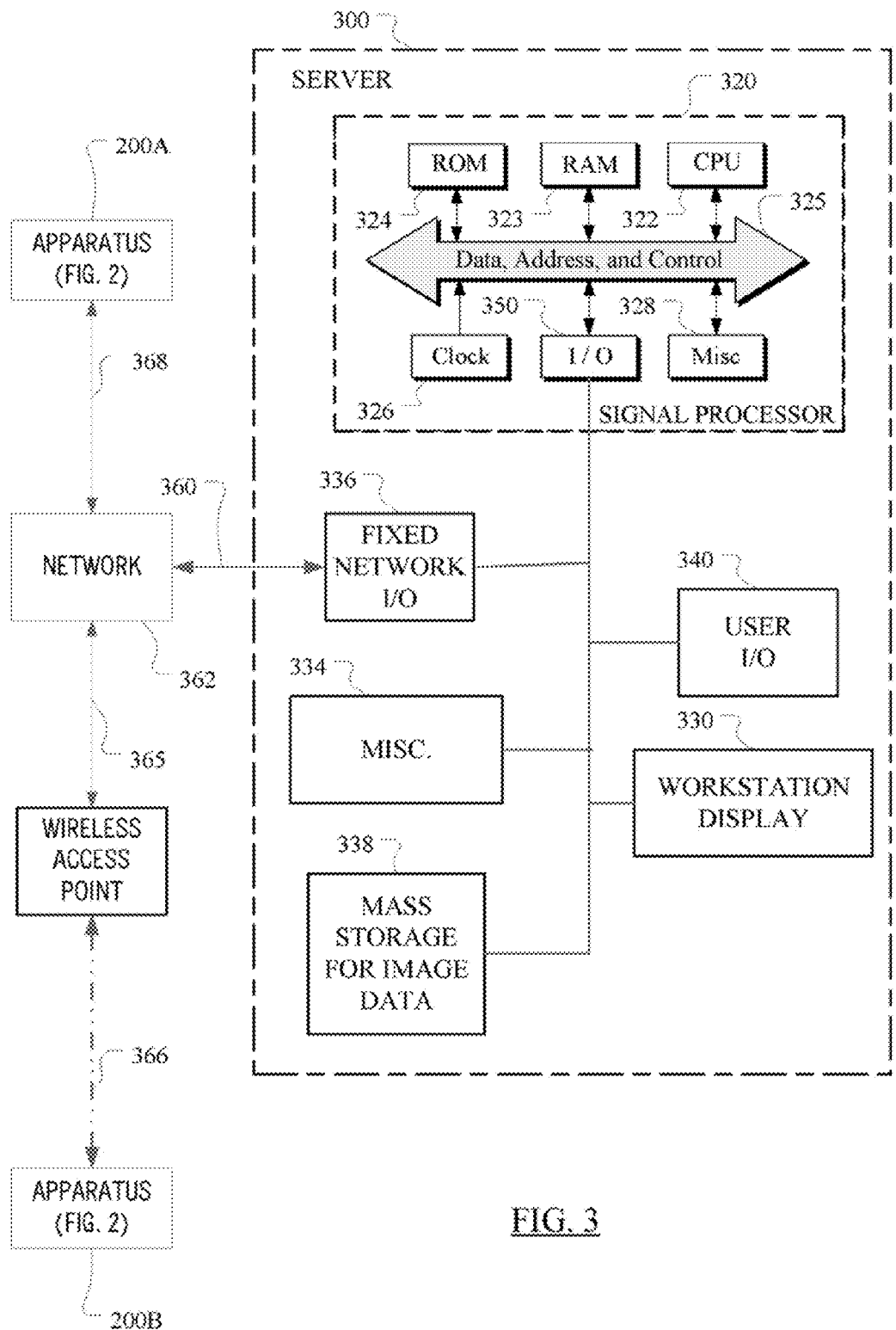
FIG. 3 shows a server communicating with a wireless apparatus and a fixed line apparatus such as shown in FIG. 2.

As mentioned, the apparatus 200 may include the user input device or functionality 240 to allow a user of the apparatus to provide input, e.g., to select the focus depth by means other than the eye tracker 230. The user input device may comprise a digital light field camera as part of the apparatus 200. Such a camera may include an encoder that may be used to compress the digital light field data captured by the camera 240 and to store same on a memory device also in the apparatus 200 or even outside on another memory device that is not part of the apparatus 200. The eye tracker 230 may be used in conjunction with for instance a plenoptic camera 240 to select the layer or different layers in succession and/or the encoding (such as foveation) employed within a given layer for storage and later viewing or for transmittal to a server such as shown in FIG. 3. The user input device might comprise a mouse, trackball, touchscreen, joystick, buttons, or similar input device alone or in combination. The various elements 210, 230, 234, 236, 238, 240 of the apparatus 200 may be interconnected to an input/output device 250 of the processor 220 which is in turn connected to data, address, and control lines 225 interconnecting the CPU 222, RAM 223, and ROM 224 as well as a clock 226, a battery (not shown), and other miscellaneous internal parts 228 that are not shown for the sake of simplicity. The user input device 240 (or the input/output device 250) may include a wireless transceiver device that provides wireless connectivity Device 240 may also include but is not limited to the above mentioned removable memory port or RJ-45 receptacle along with the transceiver hardware for providing the mentioned wireless connectivity in conjunction with software or coded instructions in a memory such as the memory device 224.

As explained previously in connection with the method 100 of FIG. 1, the at least one memory and the computer program code may be configured to, with the at least one processor, cause the apparatus to continuously loop through with the steps 110, 120 until instructed otherwise such as by a user input, or by an algorithmic decision, or to explicitly decide to continue with steps 110, 120 in a decision 140, or to detect 150 a change in the eye gaze of the user to gaze at a different object at a different focus depth and present and/or store the selected 110 image data layer corresponding to the changed input, instruction, or detected change in the eye gaze of the user at a focal length corresponding to the different focus depth.

As also explained previously, the apparatus may be configured to display and/or store the image data including of objects having focus depths that are different than the selected focus depth of the one or more of the plurality of objects so as to be out of focus.

Whether or not the apparatus 200 is provided with an eye gaze tracker 230, the display of the image data may include display 160 of portions of the displayed image data radially surrounding the at least one of the one or more objects to be displayed with less distinction to simulate human vision (e.g. the above-mentioned "foveation") where objects surrounding an object at which visual attention is directed appear with less distinction than the object at which the visual attention is directed. The processor 220 may be configured with region-of-interest coding capability such as provided by JPEG 2000 or Motion JPEG 2000 to encode the region-of-interest with more distinction, e.g. higher resolution, according to the region of the field of view of the image wherein the eye of the user is tracked or where the image creator want to direct the positioning of the foveation within the imagery and provides an appropriate input corresponding thereto.

In one embodiment, the steps 110, 120 can be repeated rapidly in succession at a preselected plurality of focus depths so as to rapidly display the scene as a layered set of images or pictures presented with each layer at a different depth so as to present a three dimensional representation of the plurality of objects in the scene. The objects in the scene may be static or in motion or some objects in motion and others not. The objects may be real or imaginary, including living persons, animals or insects, or may be animated representations of persons or nonpersons, or a combination of real and animated. The several layers could, for example, be preselected as representing the set of layers, one corresponding to a far depth, another at an intermediate depth, another at a near depth, and yet another at a close depth. All or at least more than one of the preselected layers can then be presented in rapid succession, each at its own layer depth and corresponding focal length, e.g., one after the other in a "layered set" time interval or period, and then repeating the presentation of the layered set in cyclic fashion in successive layered set time periods for as long as desired. For instance, if the overall cyclic repetition rate of the layered set of images is thirty times per second and there are four layers in each set of images, all of which are to be presented in sequence within each repetition of the cycle, then the rate at which the different layers are presented is four times the cyclic rate, i.e., one hundred and twenty times per second. In that event, each individual layer is presented thirty times per second. Depending on the available processing power and the responsiveness of the at least one SLM 210, a greater number of layers may be utilized to increase the granularity of the presentation so as to increase the depth perception effect in the viewer's visual apparatus.

Regarding the digital light field image data, it may be created in one or more different ways. For instance, in viewing prerecorded content, the selection 110 may have been done automatically by a computer program evaluating the scene and selecting a focus depth corresponding to an object algorithmically judged to be the most salient object in the scene. Another example would be to have the selection done automatically by a computer program evaluating the scene and selecting the focus depth corresponding to a depth of an object judged to be in motion. Such could be done for each cyclic repetition described above if the imagery presented is a video or a motion picture. Another example would be a user of imaging software on a workstation preselecting the focus depth in an image creation or manipulation process that could also be changed for different cyclic repetitions. Another example would be a cameraman or director selecting the focus depth in the act of shooting the scene with an image acquisition device such as camera, a virtual camera, or a combination of a camera and a virtual camera. Information to display 120 the image data at a focal length corresponding to the selected focus depth may be included in the image data or the apparatus 200 may decide the focal length in dependence on other information provided such as the selected focus depth.

According to embodiments, variations on the number of layers or of the quality of each separate layer presented during each cyclic "layered set" repetition may be utilized. For instance, the selection 110 may include the selection of one or more enhanced layers among the set of layers that is or are presented with one or more different image characteristics such as at a higher resolution than the other layers in the set, or with foveation. Such a foveated area may include color information with the surrounding areas and layers including monochrome information only. The selected one or more enhanced layers may change from one set to a following set. The selection 110 may include the selection of a plurality of closely spaced enhanced layers in a given set of layers that are presented with foveation, i.e., with only a part thereof at a higher resolution and/or with color information than the rest of the imagery of the pictures of those enhanced layers. In that case, other layers in the set may also be presented with resolution lower (and/or with monochrome radiance points only)

than that of the foveated part of the one or more enhanced layers. Or, in addition to the more or less preselected layered sets described above (e.g. four layers at the same depth per set at thirty sets per second), the selection 110 may include one or more such layered sets being augmented by the addition of one or more layers with enhanced image characteristics interleaved between a selected pair of the layers of a given set with the position of the interleaving one or more enhanced layers changing in depth from set to set so that the interleaving is dynamic and is able to change to different focus depths in between different pairs at correspondingly different preselected depths. Or, the number of layers and/or their depths could change from set to set. For instance, starting from the example above with a layered set repetition rate of thirty per second for each of the sets with the preselected layers presented with at least one image characteristic such as low resolution and/or monochrome radiance points, a new enhanced layered set can be interleaved between each set with the enhanced set having only one layer or several closely spaced layers and that enhanced set having at least one picture with an enhanced image characteristic different from the preceding set and the subsequent set (such as a color layer or partly monochrome layer with an area of foveation presented with tightly spaced points having color radiance). If the set repetition rate is then doubled to sixty times per second, then the enhanced layer set (e.g., with only one enhanced layer) may be presented more than once at the same focus depth, e.g. four times. In such a case where the overall set repetition rate would be sixty times per second, and the original sets would only be presented every other set, then the original preselected layers would stay at one hundred and twenty layers presented per second. Since every other set would have only one layer presented four times in one sixtieth of a second at the same focus depth, the layers of the one layer sets would also have a repetition rate of one hundred and twenty layers presented per second. Likewise, if there were four closely spaced enhanced layers presented at four correspondingly closely spaced focus depths, the repetition rate would be one hundred and twenty enhanced layers presented per second. In either case, the overall rate of the layers presented would then be two hundred and forty layers per second with every other set having enhanced image characteristics.

Selection of focus depth for image data 110 may be carried out for one or more layers in a set of layers with an algorithm in the form of computer program code stored in a memory either on the apparatus 200 or on a separate image acquisition device as described above or on a workstation of a worker in the art of image creation or manipulation or a director. Such an algorithm may search for objects in motion in image data at a layer of a set and if found apply enhancement to a moving object in a part of the image in order to improve perception of the image of the object presented to the viewer. Image data enhancement may be applied at one or more such layers in a given set.

Compression of the light field image data in the form of a sequence of pictures in layered sets may be effected, e.g., on a layer level basis so that pictures at the same level in successive sets are grouped for removal of redundancies using known compression techniques, e.g., using reference pictures, intra-coded pictures, and inter-coded pictures with appropriate ordering thereof, to encode a signal. The separate compression for each level may be carried out as parallel processes. A decoder in the apparatus 200 may be provided to perform a decompression on data retrieved from storage or received over a network, i.e., in processes inverse to that performed on the compressor. That is, the digital light field image data (1) may be received by the apparatus 200, or (2) may be digital light field image data retrieved from storage if the user input device 240 includes a memory device, or (3) may be digital light field image data generated in the apparatus 200 (if for instance the input device 240 in the apparatus is e.g. a plenoptic camera that stores compressed data on a memory device such as memory 223 and/or memory 224). In any event, the digital light field data may be a compressed sequence of pictures organized in layered sets that are to be presented in a timed sequence, wherein the compression is or was carried out on a layer level basis with pictures at a same level in successive sets and ready for decompression at a group level so that separate decompressions for picture sequences at each level are executable as parallel decompression processes. The decompression may be carried out by the signal processor 220 executing a decoding/decompression operation according to programmed instructions stored as computer program code on the memory 223 which comprises at least one non-transitory computer readable storage medium.

FIG. 3 shows a server 300 that includes a signal processor 320 that may include hardware and software features similar to those already described in connection with FIG. 2. The server 300 may include a user input/output device or functionality 340 to allow a user of the server to provide input, e.g., to select a focus depth by some input means. The input device may comprise a digital light field camera as part of the server 300. Such a camera may include an encoder that may be used to compress the digital light field data captured by the camera 340 and to store same on a memory device also in the server 300 or even outside on another memory device that is not part of the server 300. The user input device might comprise a mouse, trackball, touchscreen, joystick, buttons, or similar input device alone or in combination as well as other miscellaneous components 334. The user input/output device 340 may be interconnected to an input/output device 350 of the processor 320 which is in turn connected to data, address, and control lines 325 interconnecting a CPU 322, RAM 323, and ROM 324 as well as a clock 326, and other miscellaneous internal parts 328 that are not shown for the sake of simplicity. The user input device 340 or the input/output device 350, or both, may be connected to a fixed network interface 336. The interface 336 may be connected on a line 360 to a network 362 which may in turn be connected on a line 368 to an apparatus 200A such as an apparatus made according to FIG. 2 via the network 362. The server 300 may also be connected on lines 365, 366 to another apparatus 200B similar to the apparatus of FIG. 2 except configured for wireless connectivity via a wireless access point, as shown, which may be part of a public land mobile network, a Wi-Fi network, etc. A mass storage device 338 is shown in the server 300 connected to the signal processor 320 for storing digital light field data. Such data may be stored for delivery to at least one apparatus 200A, . . . , 200B. The data stored in the mass storage device 338 may originate from an apparatus 200A (for instance if it is equipped with a plenoptic camera) or from more than one such apparatus 200A, . . . , 200B and stored for sharing purposes or for serving as an archive. The server may also store digital light field data provided by professional entertainment companies for sale to users of apparatuses 200A, . . . , 200B. The digital light field data may be downloaded from the mass storage device 338 to one or more apparatuses 200A, . . . , 200B as self contained files for local storage or may be streamed for immediate consumption. For instance, the server 300 may receive a signal on the line 360 that originates on the line 366 from the apparatus 200B, and in response to the request, the server retrieves from the mass storage device 338, a signal comprising digital light field image data at a selected a focus depth that represents a scene having a plurality of objects at different focus depths, the selected focus depth corresponding to a layer of the light field image data at the selected focus depth. The retrieved image data is then configured as a downloadable file or as a streaming signal for transmittal via the fixed network interface 336 on the line 360 to the network 362 and where it is forwarded on the line 365 to the wireless access point and from there to the requesting apparatus 200B over the wireless interface 366. The apparatus 200B is then able to display (or store for later display) the layer of the digital light field image data by utilizing the at least one spatial light modulator 210 in the user apparatus 200B to present the layer of the digital light field image data at a focal length corresponding to the selected focus depth. The server may also retrieve and transmit to the user apparatus 200B a digital light field data signal including a plurality of focus depths for presentation by the user apparatus as a corresponding plurality of layers of the light field image data at a corresponding plurality of focal lengths so as to represent the scene as a set of digital light field image data layers in a three dimensional representation of the plurality of objects in the scene. The plurality of focus depths may be preselected and successive sets of image data layers may be for presentation cyclically at a set repetition rate by the user apparatus 200B. The digital light field image data may be a sequence of pictures in layered sets compressed on a layer level basis with pictures at a same level in successive sets grouped for decompression so that separate decompressions for picture sequences at each level are executable as parallel decompression processes. The digital light field data may be configured for display of a portion of the image data radially surrounding the at least one of the one or more objects to be displayed with less distinction to simulate human vision where objects surrounding an object at which visual attention is directed appear with less distinction than the object at which the visual attention is directed. For instance, more distinction may take the form of an area of higher resolution and/or color as opposed to black and white in surrounding areas with lesser resolution. For the situation where the plurality of focus depths is preselected and successive sets of image data layers are for presentation cyclically at a set repetition rate by the user apparatus, each such set could have a preselected number of monochrome layers at the same focus depth with uniformly reduced resolution while every other set may be provided with one or more higher resolution layers and/or may be provided at a depth that changes depth every other set. Such every other set may instead or in addition be provided with a small color area of foveation. The foveation area may be provided with higher resolution.

Although the invention has been shown and described with respect to a best mode embodiment thereof, it should be understood by those skilled in the art that the foregoing and various other changes, omissions and deletions in the form and detail thereof may be made therein without departing from the spirit and scope of the invention.

The invention claimed is:

1. A method, comprising:
    selecting a focus depth for digital light field image data that represents a scene having a plurality of objects at different focus depths, the selected focus depth corresponding to a layer of the light field image data at the selected focus depth, and
    displaying the layer of the digital light field image data by an apparatus utilizing at least one spatial light modulator in the apparatus to present the layer of the digital light field image data at a focal length corresponding to the selected focus depth.

2. The method of claim 1, further comprising selecting a plurality of focus depths and the apparatus presenting a corresponding plurality of layers of the light field image data at a corresponding plurality of focal lengths so as to represent the scene as a set of digital light field image data layers in a three dimensional representation of the plurality of objects in the scene.

3. The method of claim 2, wherein said plurality of focus depths is preselected and successive sets of image data layers are presented cyclically at a set repetition rate by the apparatus.

4. The method of claim 1, further comprising the apparatus:
    detecting eye gaze of a user and selecting the focus depth based on the detected eye gaze of the user, and
    presenting a layer of the digital light field image data for the detected focus depth at a focal length corresponding to the selected focus depth.

5. The method of claim 4, further comprising by the apparatus evaluating the scene and selecting the focus depth corresponding to a depth of an object judged to be in motion.

6. The method of claim 1, wherein the digital light field image data is a sequence of pictures in layered sets compressed on a layer level basis with pictures at a same level in successive sets grouped for decompression so that separate decompressions for picture sequences at each level are executable as parallel decompression processes.

7. An apparatus, comprising:
    at least one processor; and
    at least one memory including a program comprising a plurality of steps performable by the at least one processor to cause the apparatus at least to perform the steps of:
        selecting a focus depth for light field image data-that represents a scene having a plurality of objects at different focus depths, the selected focus depth corresponding to a layer of the digital light field image data at the selected focus depth, and
        displaying the layer of the digital light field image data utilizing at least one spatial light modulator to present the layer of the digital light field image data at a focal length corresponding to the selected focus depth.

8. The apparatus of claim 7, wherein the plurality of steps are performable by the at least one processor to cause the apparatus at least to perform the steps of:
    selecting a plurality of focus depths and
    displaying the image data at a corresponding plurality of focal lengths so as to represent the scene as a set of image data layers in a three dimensional representation of the plurality of objects in the scene.

9. The apparatus of claim 8, wherein said plurality of focus depths is preselected and successive sets of image data layers are presented cyclically at a set repetition rate.

10. The apparatus of claim 9, wherein a number of layers in one or more successive sets is varied during selected cyclic set repetition periods.

11. The apparatus of claim 9, wherein an image characteristic of one or more separate layers is varied during selected cyclic set repetition periods.

12. The apparatus of claim 7, wherein the plurality of steps are performable by the at least one processor to cause the apparatus at least to further perform the steps of:
    detecting eye gaze of a user and select the focus depth based on a change in the detected eye gaze of the user, and
    presenting the layer of the digital light field image data for the detected focus depth at the focal length corresponding to the selected focus depth.

13. The apparatus of claim 7, wherein the plurality of steps are performable by the at least one processor to cause the apparatus at least to further perform the step of:

evaluating the scene and select the focus depth corresponding to a depth of an object judged to be in motion.

14. The apparatus of claim 7, further comprising a user input device comprising a digital light field camera in the apparatus for providing said digital light field image data.

15. The apparatus of claim 7, wherein the displaying of the image data includes displaying a portion of the displayed image data judged to include an object in motion with greater distinction than portions surrounding the portion judged to include an object in motion.

16. A method, comprising:

a server retrieving from a storage device on the server, in response to a request from a user apparatus, a signal comprising digital light field image data at a selected a focus depth that represents a scene having a plurality of objects at different focus depths, the selected focus depth corresponding to a layer of the light field image data at the selected focus depth, and transmitting the retrieved signal to the user apparatus for display of the layer of the digital light field image data by the user apparatus utilizing at least one spatial light modulator in the user apparatus to present the layer of the digital light field image data at a focal length corresponding to the selected focus depth.

17. The method of claim 16, further comprising the server retrieving and transmitting to the user apparatus a digital light field data from plurality of focus depths for presentation by the user apparatus as a corresponding plurality of layers of the light field image data at a corresponding plurality of focal lengths so as to represent the scene as a set of digital light field image data layers in a three dimensional representation of the plurality of objects in the scene.

18. The method of claim 17, wherein said plurality of focus depths is preselected and successive sets of image data layers are for presentation cyclically at a set repetition rate by the user apparatus.

19. The method of claim 16, wherein the digital light field image data is a sequence of pictures in layered sets compressed on a layer level basis with pictures at a same level in successive sets grouped for decompression so that separate decompressions for picture sequences at each level are executable as parallel decompression processes.

20. The method of claim 16, wherein the displaying includes displaying a portion of the displayed image data radially surrounding the at least one of the one or more objects to be displayed with less distinction to simulate human vision where objects surrounding an object at which visual attention is directed appear with less distinction than the object at which the visual attention is directed.

* * * * *